July 5, 1955  J. J. ZAKRAJSEK  2,712,246
GEAR REDUCER AND DRIVING-CLUTCH ARRANGEMENT
Filed Sept. 16, 1953  3 Sheets-Sheet 1

INVENTORS
BY JOSEPH J. ZAKRAJSEK
*Alfred G. Body*
ATTY.

July 5, 1955  J. J. ZAKRAJSEK  2,712,246
GEAR REDUCER AND DRIVING-CLUTCH ARRANGEMENT
Filed Sept. 16, 1953  3 Sheets-Sheet 3

INVENTORS
BY JOSEPH J. ZAKRAJSEK
Alfred C Body
ATTY.

United States Patent Office 2,712,246
Patented July 5, 1955

2,712,246

GEAR REDUCER AND DRIVING-CLUTCH ARRANGEMENT

Joseph J. Zakrajsek, Willoughby, Ohio, assignor to The Ohio Gear Company, Cleveland, Ohio, a corporation of Ohio Application September 16, 1953, Serial No. 380,489

3 Claims. (Cl. 74—426)

This invention pertains to the art of speed-reducing power transmissions and, more particularly, to an intermittently operated power transmission of the geared type.

The invention is particularly adapted to applications wherein a single cycle of movement at a low speed and high torque is required to be delivered from a relatively high-speed, low-torque power source such as a single-phase electric motor and will be described with particular reference thereto, although it will be appreciated that the invention has broader applications. The particular application in mind is for use in pin setters for bowling alleys wherein a pin-setting rack is normally held in an elevated position and intermittently caused to descend, set pins and return to the elevated position.

Apparatus of the type to which this invention pertains is normally comprised of an electric motor driving a gear reducer, the output shaft of which is connected to the pin-setting mechanism. These electric motors are normally of the single-phase type which are not adapted to repeated stops and starts, particularly under load. Also, rapid starting and stopping of the motor so as to accurately position the pin-setting mechanism at the end of each cycle is difficult. It is, accordingly, considered desirable that the electric motor run continuously and that some form of clutch mechanism be provided between the motor and the output shaft.

The service demands on such clutches are extremely severe. Normally, a rapidly rotating part is quickly and positively engaged with a stationary part and the forces involved are very high. Trouble has been experienced in the past with the clutch slipping or locking in engagement with the resultant repeating cycles of the pin-setting mechanism or with undue wear and short life.

Another problem with apparatus of this type has been that of quickly disengaging the clutch at the proper position of and quickly stopping the output shaft and thereafter locking such shaft in this position.

In view of the above, the present invention contemplates an intermittently operated power transmission of the gear type which overcomes the objections of the prior art and provides a transmission which is simple in construction and positive in operation.

In accordance with the present invention, there is provided a speed-reducing transmission having a continuously running input shaft and an intermittently operating output shaft and clutch mechanism for mechanically interconnecting same. The input shaft rotates continuously inside of a drive gear. A clutch has a driven member mechanically connected to the drive gear and a drive member fastened to the input shaft. These two members have radially facing spaced surfaces, one being cylindrical and coaxial with the axis of rotation and the other being arcuate with a center of curvature on the opposite side of spaced from the axis to define a generally crescent-shaped space having a maximum width at the mid point of the arcuate surface. A wedge member is disposed in this space with a width slightly less than the width of the space and adapted to be wedged between the surfaces for the purpose of transmitting a torque force from the drive member to the driven member.

A collar mounted on the driven member and coacting with the wedge member as well as a control member engages and disengages the clutch.

The collar and driven member are each so arranged as to coact with the control member and lock the driven member against rotation once the clutch is disengaged.

The control member also coacts with the output shaft to allow the clutch to remain engaged for a predetermined rotation of the output shaft and then disengage the clutch at a predetermined point in the rotation of the shaft.

The principal object of the invention is the provision of a new and improved power transmission having a continuously rotating input shaft, an intermittently rotating output shaft and an integral clutch arrangement for controlling the rotation of the output shaft which is simple in structure, compact in size and positive in operation.

Another object of the invention is a new and improved power transmission of the type referred to having a clutch and means cooperatively associating the output shaft with the clutch whereby the clutch may be automatically disengaged at a predetermined point or points in the position of the output shaft and the output shaft locked in that position.

Still another object of the invention is a new and improved clutch arrangement for power transmission comprised of a pair of coaxial members rotatable about a common axis and having opposed arcuate surfaces between which a wedge member is adapted to selectively be wedged and dewedged, the relative curvature of the surfaces being such as to provide an improved wedging action on the wedge member.

Still another object of the invention is the provision of a new and improved clutch arrangement comprising a pair of coaxially arranged members having arcuate surfaces with a wedge member therebetween, one of the arcuate surfaces having a center of curvature coincident with the axis of rotation and the other surface having a center of curvature on the opposite side of the axis of rotation and spaced therefrom.

The invention may be embodied in certain parts and arrangement of parts, a preferred embodiment of which will be described in detail in this specification and illustrated in the accompanying drawing which is a part hereof, and wherein.

Figure 1:
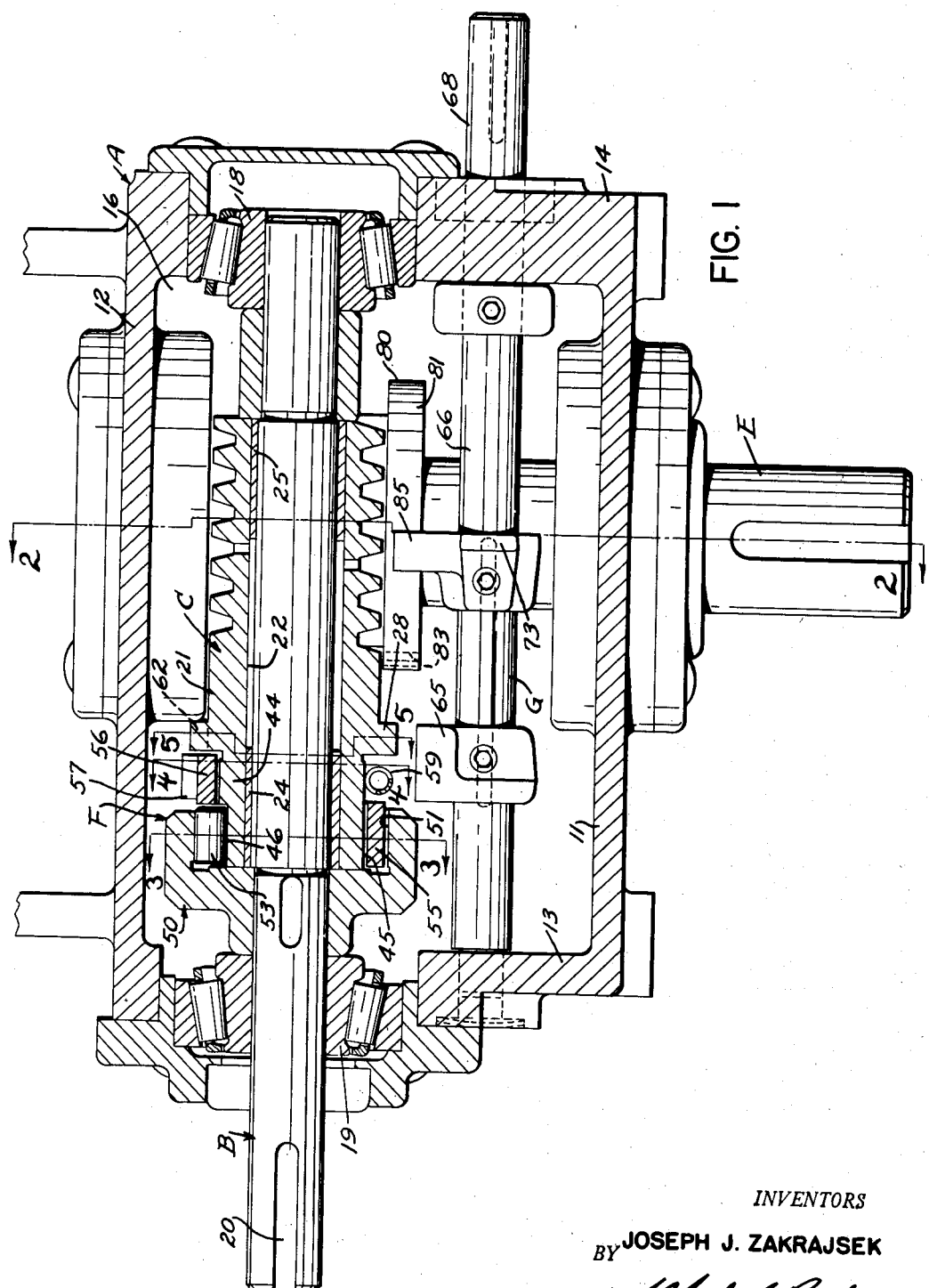
Figure 1 is a top cross-sectional view of a power transmission embodying the present invention.
Figure 2:
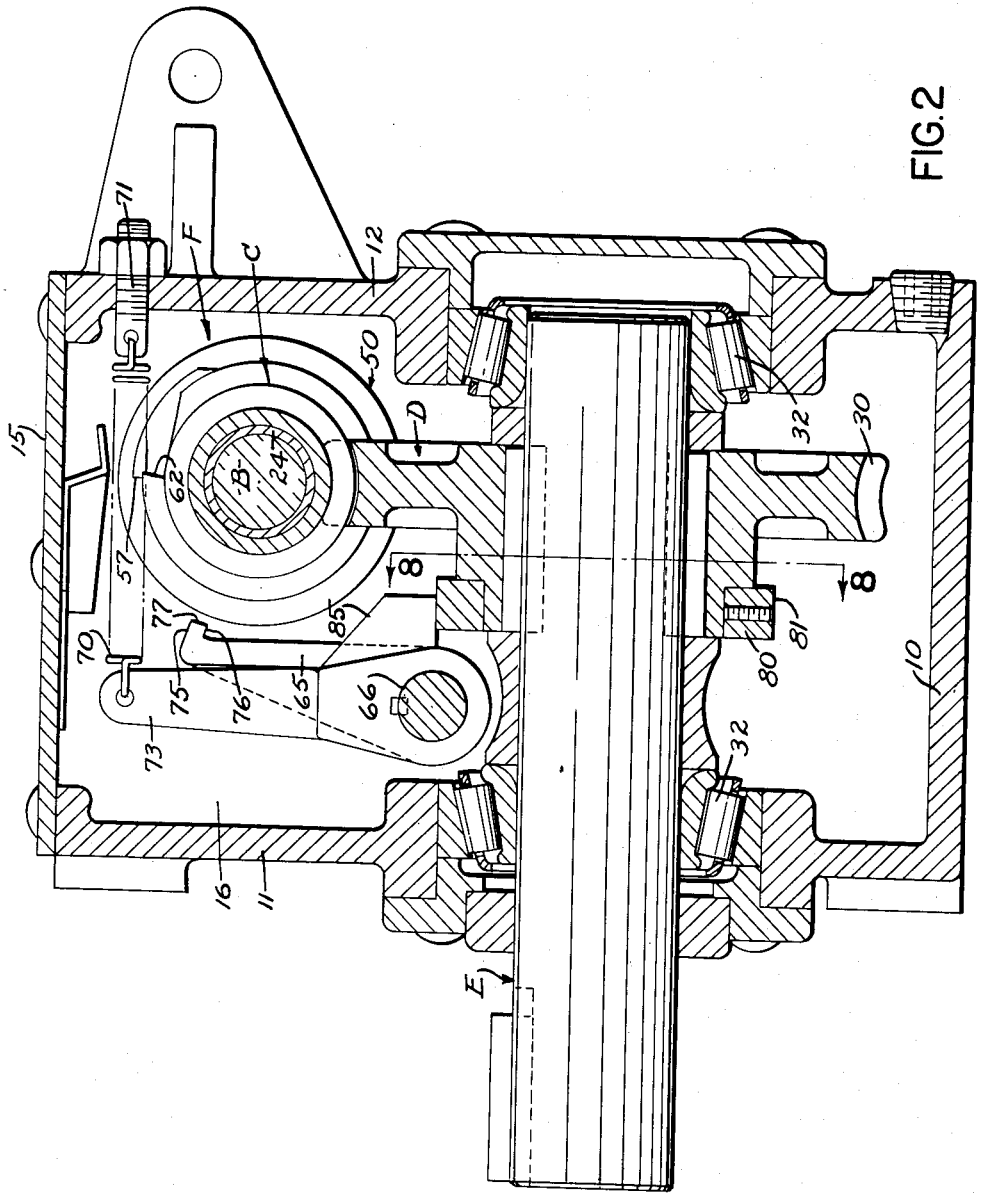
Figure 2 is a cross-sectional view of Figure 1 taken approximately on the line 2—2 thereof.

Referring now to the drawings wherein the showings are for the purposes of illustrating the invention only and not for the purposes of limiting same, the figures show generally a power transmission embodying the present invention and including generally a housing A, an input drive shaft B, a drive gear C, a driven gear D, an output shaft E, a clutch arrangement F and operating members G operatively associated with the output shaft E and the clutch arrangement F whereby to control the transmission of power from the shaft B to the shaft E.

The housing A, which forms no part of the present invention, is generally in the form of a casting comprised of a base 10, spaced side walls 11, 12, spaced end walls 13, 14 and a top 15 removably mounted in a continuous rabbet in the upper edges of the end and side walls 11, 12, 13 and 14, all defining an interior 15 in which the power-transmission mechanism is mounted.

The end walls 13, 14 are each provided with aligned openings in which tapered roller bearings 18, 19 are mounted for the purpose of rotatably supporting the drive shaft B, which drive shaft B extends from the right-hand bearing 18 through the interior of the housing A, through the left-hand bearing 19 to a point exteriorly of the housing. The portion of the shaft B extending beyond the housing is provided with a key-way 20 by which a drive gear or coupling can be suitably fastened to the shaft B. This shaft B continuously rotates.

The drive gear C is supported interiorly of the housing A on this shaft B. In the embodiment shown, the drive gear C is in the shape of a sleeve 21 having an internal passage 22 of a diameter slightly greater than the diameter of the shaft B through which the shaft B extends. A pair of bearings 24, 25, one at each end of the sleeve 21 allows the sleeve to be stationary while the shaft B rotates. The right-hand end of the sleeve 21 has worm gear teeth formed therein of conventional construction and design which mesh with teeth 30 on the driven gear D. This driven gear D as shown as keyed to the shaft E which extends through the housing A at right angles to the axis of the shaft B and is mounted in suitable openings in the sides 11, 12 in tapered roller bearings 32, 33.

It will be obvious that as the gear C is rotated, the gear D will be rotated at a reduced speed which, in turn, will rotate the shaft E at a similar speed.

Generally, it may be said that the gearing just described is relatively conventional and as it forms no part of the present invention, except as it otherwise cooperates with the clutch mechanism F and the control members G for carrying out the invention, it will not be described further herein.

The left-hand end of the sleeve 21 forms generally the driven member of the clutch mechanism F and is comprised generally of a portion 44 having a generally cylindrical outer surface 45 provided with a wedging surface 46. (See Figure 3.)

The clutch mechanism F also includes a drive member 50 keyed to the shaft B and having a radially inwardly facing cylindrical surface 51 coaxial with and spaced from the cylindrical surface 45. The wedging surface 46 has a radius of curvature greater than that of the cylindrical surface 45 and an axial length approximately one half of the cylindrical surface 45 and defines with the surface 51 a space for a wedge member 53 of a radial width greater than the maximum spacing between the wedge surface 46 and the cylindrical surface 51 and less than the spacing between the cylindrical surface 51 and the cylindrical surface 45. This wedge member 53 is in the shape of a cylinder having its axis parallel to the axis of rotation of the shaft B and a length generally equal to the axial length of the wedge surface 46.

When the clutch F is engaged, the wedge member 53 is locked or wedged between the cylindrical surface 51 and the wedge surface 46 in such a manner that increases in the amount of driving torque applied to the drive member tends to wedge the member 53 tighter between the surfaces, thus tending to further increase the locking and driving action.

The wedging or locking action is generally proportional to the angle between the perpendiculars from the points of engagement of the two surfaces with the surfaces of the wedge member 53. It will be appreciated that the mid point of the wedge surface 46 is parallel to the cylindrical surface 51. Also, this is the maximum spacing between the drive member and the driven member. If the wedge member had a diameter equal to this thickness, the angle between the perpendiculars above referred to would be 0 degrees. As the wedge is made smaller and smaller in diameter, obviously it must be positioned progressively further from the mid point of the wedge surface 46 before driving engagement occurs. As the wedge member is moved further from the mid point, the angle between the perpendiculars increases. At some angle depending upon the coefficient of friction between the cylindrical and wedge surfaces and the material of the wedge member itself, the wedge member will be forced out of locking engagement and the clutch will tend to slip under extremely heavy loads or otherwise undesirable conditions.

Figure 3:
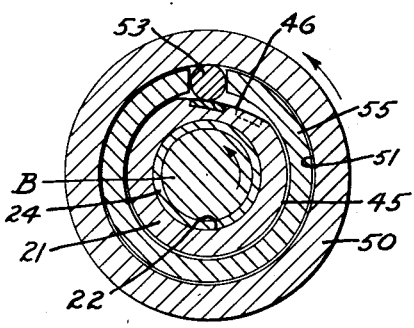
Figure 3 is a cross-sectional view of Figure 1 taken approximately on the line 3—3 thereof and showing details of the clutching mechanism, the figure showing the clutch in locked relationship.

Obviously, some clearance must be provided between the wedge member 53 and the wedging surfaces so that the clutch can, when desired, run in a disengaged manner. However, for a given ratio of diameter of the wedge member 53 to the maximum dimension between the wedge surface 46 and the cylindrical surface 51, the present construction and shape of the wedging surface 46 provides an improved locking action. The wedge surface 46 is, as shown in Figure 3, arcuate in shape and has a center of curvature at least on the opposite side of the axis of the cylindrical surface 45 so that for any given ratio of wedge-member diameter to the maximum dimension above referred to, a maximum angle between the perpendiculars can be obtained at the point where the clutch engages.

This angle may, of course, be varied by adjusting the thickness of the wedge member, or by adjusting the maximum clearance or spacing at the mid point of the wedge surface 46, or by adjusting the radius of curvature of the wedge surface 46. The preferred embodiment contemplates having the center of curvature at a point located on the cylindrical surface 45, it having been found that this slight curvature of the wedge surface 46 gives a far superior wedging action to a flat or plane wedging surface used heretofore. Also, the surface is readily manufactured in an economical manner. It should be pointed out that the curvature of the surface 46 should not be made too large, else the angle between the perpendiculars will become too small and there will be an extreme tendency for the wedge member 53 to become locked in the engaged position and difficult to remove.

Figure 4:
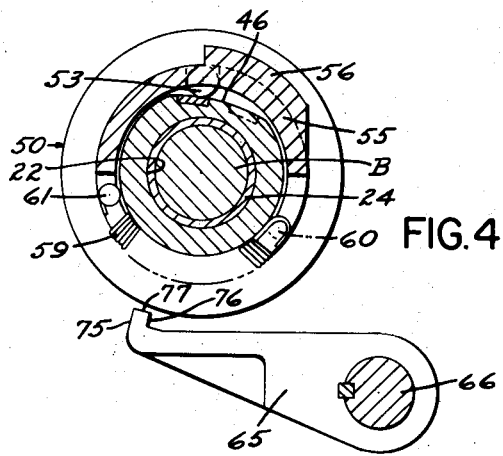
Figure 4 is a cross-sectional view of Figure 1 taken approximately on the line 4—4 thereof and showing further details of the clutching mechanism together with the control member for actuating same.

For the purpose of engaging and disengaging the clutch mechanism F, a collar 55 is provided which is mounted over the cylindrical surface 45 and fits into the space between the surfaces 45 and 51. This collar is provided with an axially extending slot of a width to just receive the wedge member 53. Additionally, the collar 55 has a portion 56 extending to the right beyond the end of the drive member 50. This portion has a shoulder 57 facing in the direction of rotation. It will be noted that the portion 56 bridges the slot formed to receive the wedge member 53, thus making the collar a solid circumferentially extending ring. A helical coil spring 59 fastened at one end to the sleeve 21 by means of a pin 60 and at the other end to the collar 56 by means of a pin 61 biases the collar 55 in a direction corresponding to the usual direction of rotation of the clutch drive member 50; that is, it biases the wedge member 53 into the clutch-engaging position shown in Figure 4.

Figure 7:
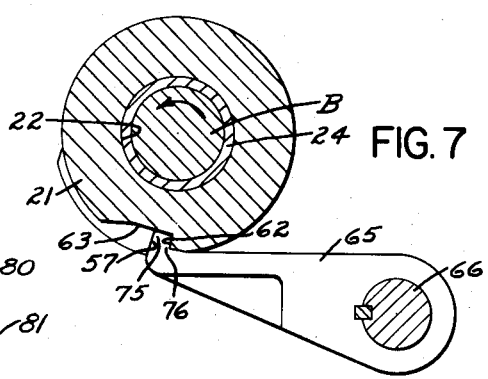
Figure 7 is a view similar to Figure 5 but showing the control member in engaged position.

The sleeve 21 also has a shoulder 62 facing in a direction opposite to the normal direction of rotation; that is to say, in a direction opposite from the facing of the shoulder 57. The shoulder 62 and the shoulder 57 are so positioned relative to each other that when the clutch is in the engaged position, the shoulder 57 is located a short distance in the direction of rotation beyond the shoulder 62. (See Figure 5.) Obviously, by relatively rotating the shoulder 57 (see Figure 5) in a direction opposite to that of the rotation and against the biasing force of the spring 59, the two shoulders 57 and 62 may be made to come into spaced, nonoverlapping relationship as shown in Figure 7. It will also be noted that the shoulder 62 is formed in the flange 28 of the sleeve 21 by cutting away a small portion of the flange 28 as at 63. It will also be noted that the portion 56 of the collar 55 has a relatively short peripheral extent but has a diameter greater than the diameter of the flange 28.

For the purpose of engaging and disengaging the clutch, a dog 65 is provided mounted on a shaft 66 pivotally supported in the ends 13, 14 of the housing and extending in a direction parallel to but spaced from the axis of the shaft B. This shaft 66 extends beyond the right-hand side of the housing A as at 68 and is provided with a keyway whereby a suitable operating lever can be mounted on the shaft. The dog 65 is mounted on the shaft 66 so as to be in general alignment with the collar 55 and the surface of the flange 28. A spring member 70 fastened at one end to the housing by means of an adjusting screw 71 and at the other end to a lever arm 73 keyed to the shaft 66 biases the dog 65 toward engagement with the collar 55 and the flange 28. This dog 65 has a shoulder 75 adapted to engage the shoulder 57 as it rotates and force the wedge member 53 out of locking engagement. The dog also has an oppositely facing shoulder 76 adapted to engage the shoulder 62.

Thus, if it be assumed that the clutch F is engaged and the driving member 50 is rotating the sleeve 21 in a counterclockwise direction, when the spring 70 biases the dog 65 toward the collar 56, at first the end 77 of the dog rides on the outer surface of the flange 28 until the shoulder 57 is rotated to engage the shoulder 75 on the dog. Such engagement forcefully stops the collar 55 from rotating and instantaneously disengages the wedge member 53 from its locked position. (See Figure 6.) Because of the inertia of the sleeve 21, however, it continues to rotate a short distance against the biasing action of the spring 59. Normally, it will continue to rotate at least the width of the end of the dog 65 so that the shoulder 62 is advanced in a counterclockwise direction (see Figure 5) beyond the shoulder 57 a distance sufficient to permit the dog 65 to drop in position so that the shoulder 76 engages the shoulder 62. The sleeve 21 is then locked against rotation in either direction while the driving member 50 can continue to rotate freely.

When the dog 65 is disengaged from the two shoulders, the spring 59 immediately moves the collar 55 relative to the sleeve 21 so as to move the wedge member 53 again into locking engagement and a positive driving action will result.

The invention also contemplates an arrangement whereby once the dog 65 is disengaged and the clutch becomes engaged (see Figure 4), it will remain so until the driven shaft E has been rotated to a predetermined position or positions. To accomplish this, a camplate 80 is keyed on the driven shaft E.

Figure 5:
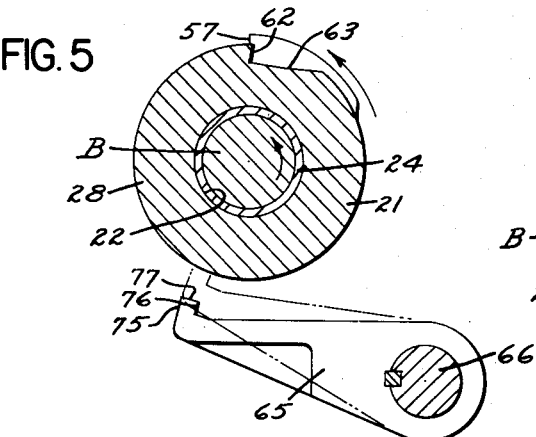
Figure 5 is a cross-sectional view of Figure 1 taken approximately on the line 5—5 thereof.
Figure 6:
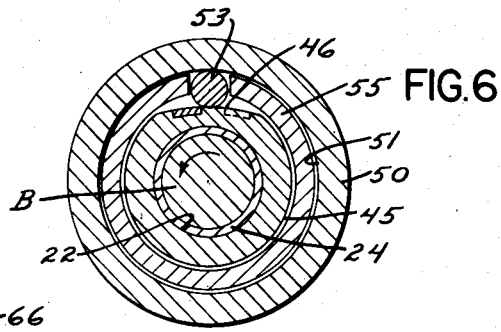
Figure 6 is a view similar to Figure 3 but showing the clutch mechanism in a disengaged position.

This camplate 80 rotates with the shaft E and has an outer periphery 81 having a cut away 82 to provide a shoulder 83 facing in a direction opposite to the direction of rotation. A follower member 85 keyed to the shaft 66 rides on the peripheral surface 81 of this camplate 80 and, when in this position, acts to hold the dog 65 in the disengaged position as shown in Figure 5. However, when the camplate 80 rotates to a point such that the follower will drop into the cut-away portion 82, the dog 65 falls into engagement with the periphery of the flange 28 until its surface 77 is engaged by the surface 57 to disengage the clutch as previously described.

Obviously, as many cut-away portions as desired can be provided on the camplate 80 or different types of cams can be employed.

Figure 8:
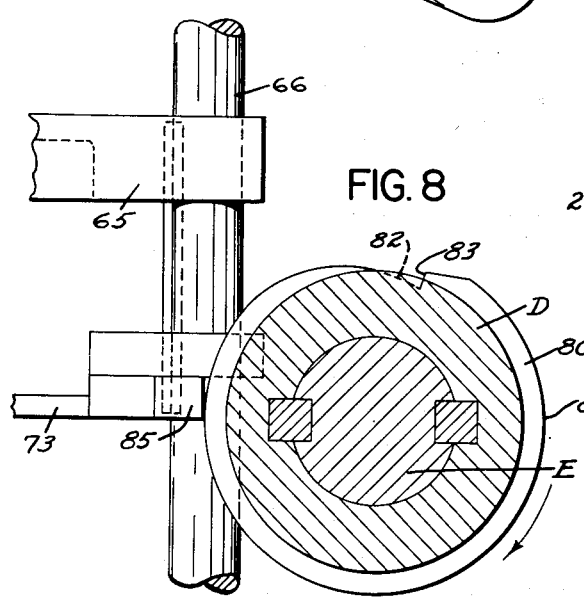
Figure 8 is a cross-sectional view of Figure 2 taken approximately on the line 8—8 thereof and showing the control means on the output shaft for disengaging the clutch at predetermined points in the rotation of the output drive shaft.

In operation, the shaft B is continuously rotating in a counterclockwise direction, being driven for such rotation by a motor not shown. The dog 65 has its surfaces 75, 76 engaged respectively with the shoulders 57 and 62, thus locking the output shaft E against rotation. When it is desired to rotate the shaft E, the dog 65 is disengaged from the shoulders just referred to by turning the shaft 66 in a counterclockwise direction as viewed in Figures 5 and 7. As soon as the dog 65 is disengaged, the spring 59 which is normally under tension moves the collar 55 in a counterclockwise direction as viewed in Figure 4 which, in turn, moves the wedge member 53 in the same direction so as to bring it into wedging engagement between the surfaces 46 and 51. Because of the limited angle between the perpendiculars of the surfaces 46 and 51 to the surfaces of the wedge member 53, the wedge member 53 is immediately jammed or wedged between the surfaces and transmits the counterclockwise rotation of the shaft B and clutch member 50 to the sleeve 21. As the sleeve 21 rotates, the gear teeth on the surfaces thereof rotates the gear D and the output shaft E, which shaft rotates in a clockwise direction as viewed in Figure 8. After the shaft E has rotated for a few degrees, the cut-away portion 82 no longer registers with the follower 85 and the operating lever may then be released. The follower 85 falls back onto the surface 81 of the cam 80. When the follower 85 rides on the surface 81, the dog 65 is held in spaced relationship to both the collar 55 and the shoulder 28. Accordingly, the transmission continues to operate even though the operating lever has been released.

The shaft E continues to rotate along with the cam 80 until the cut-away portion 82 comes into registry with the follower 85. When this occurs, the shaft 66 rotates in a clockwise direction as viewed in Figure 5, allowing the dog 65 to engage the outer edge of the flange 28. The drive gear or sleeve 21 and the collar 55 (see Figure 5) continue to rotate in a counterclockwise direction until the shoulder 57 engages the shoulder 75 on the dog 65. The impact of this engagement is sufficient to knock the wedge member 53 out of the wedging engagement between the surfaces 46 and 51 so that torque is no longer transmitted from the member 50 to the sleeve 21. However, the sleeve 21 because of its inertia continues to rotate for a short distance sufficient to circumferentially space the shoulder 62 from the shoulder 57 a sufficient distance so that the end of the dog 65 can drop into the space provided. In some instances, the sleeve 21 may tend to continue rotating an even greater distance but it does so against the increasing force of the helical coil spring 59 which tends to be elongated by such action. The coil spring 59 will tend to bring the shoulders 57 and 62 back into engagement with the shoulders 75 and 76 on the dog 65. At this point, the sleeve 21 is locked against rotation. By locking the sleeve 21 against rotation, the shaft E is likewise locked against rotation.

An insert 86 of hardened material such as carboloy may be provided in the surface 46 to take and resist the continued wearing action of roller 53 thereon. If the apparatus is to be used for rotation in both directions, a second insert 86′ may be provided circumferentially spaced from the first or the entire crescent-shaped surface 46 may be formed of such an insert.

The invention has been described in particularity with reference to a preferred embodiment of the invention. Obviously, the invention may take physical form in other apparatus differing radically from that shown in the preferred embodiment and it is my intention to include all such modifications and alterations insofar as they come within the scope of the appended claims.

Having thus described my invention, I claim:

1. In gear-reduction mechanism, a drive shaft adapted to be continuously rotated in one direction, a driven member having an outwardly facing surface mounted on said drive member fastened to said drive shaft and having an inwardly facing surface spaced from said outwardly facing surface, said driven member surface being arcuate and having a center of curvature on the opposite side of and spaced from the axis of rotation of said shaft, a wedge member disposed between said surfaces, a collar mounted on said driven member and disposed between said surfaces and having a slot to receive said wedge, said collar also having a shoulder facing in the direction of rotation, said driven member including a gear member, a driven gear engaged with said driven-member gear, a cam member rotatable with said driven gear and means operatively associating said cam member with said collar whereby to disengage said wedge member after a predetermined rotation of said cam member.

2. In a gear-reduction mechanism, a drive shaft, a drive member including a drive gear and the driven portion of a clutch mechanism, said clutch mechanism also including a drive portion fastened to said drive shaft and having radially facing surfaces coaxial with but spaced from said driven portion, said driven portion having a surface with a center of curvature on the opposite side of and spaced from the axis of rotation of said shaft, a collar disposed between said surfaces and mounted on said driven portion, said collar having a slot, a wedge member disposed in said slot, said collar also having a circumferentially facing shoulder in the direction of rotation, a spring urging said collar in said direction, said apparatus also including a driven gear in engagement with said drive gear, a cam member rotatable with said driven gear and an operating lever having a follower engageable with said cam and a member engageable with the shoulder on said collar, said cam member acting to engage said member with said collar to disengage said clutch at predetermined points in the rotation of said cam.

3. In apparatus of the type described, a drive member and a driven member, a clutch mechanically and selectively interengaging said drive and driven member, means mounted on said driven member adapted to engage and disengage said clutch including resilient means biasing said means toward engagement of said clutch, said means having a shoulder facing in the direction of rotation of said drive member, said driven member also having a shoulder facing in a direction opposite to said direction of rotation and means for first engaging said shoulder means to disengage said clutch and then said driven-member shoulder whereby to lock said driven member against further rotation.

References Cited in the file of this patent

UNITED STATES PATENTS

| 1,708,215 | Chryst | Apr. 9, 1929 |
| 1,824,431 | Hallden | Sept. 22, 1931 |
| 2,068,773 | Slider | Jan. 26, 1937 |
| 2,298,970 | Russell et al. | Oct. 13, 1942 |
| 2,652,134 | Montooth | Sept. 15, 1953 |